(12) United States Patent
Kwon et al.

(10) Patent No.: US 8,902,825 B2
(45) Date of Patent: Dec. 2, 2014

(54) WIRELESS NETWORK SYSTEM AND METHOD OF CONFIGURING THE SAME

(75) Inventors: Chang-Yeul Kwon, Yongin-si (KR);
Jae-Min Lee, Suwon-si (KR);
Seong-Soo Kim, Seoul (KR); Jae-Hwa Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 315 days.

(21) Appl. No.: 12/520,420

(22) PCT Filed: Dec. 14, 2007

(86) PCT No.: PCT/KR2007/006533
§ 371 (c)(1),
(2), (4) Date: Jun. 19, 2009

(87) PCT Pub. No.: WO2008/075856
PCT Pub. Date: Jun. 26, 2008

(65) Prior Publication Data
US 2010/0027494 A1    Feb. 4, 2010

Related U.S. Application Data

(60) Provisional application No. 60/870,720, filed on Dec. 19, 2006.

(30) Foreign Application Priority Data

Dec. 7, 2007   (KR) .................. 10-2007-0127064

(51) Int. Cl.
*H04W 4/00* (2009.01)
*H04L 5/00* (2006.01)
(Continued)

(52) U.S. Cl.
CPC .......... *H04W 28/26* (2013.01); *H04W 72/0413* (2013.01); *H04L 5/0092* (2013.01); *H04L 5/0028* (2013.01); *H04L 27/2035* (2013.01); *H04L 27/0012* (2013.01); *H04L 27/0008* (2013.01); *H04L 5/0007* (2013.01)

USPC .......... 370/329; 370/316; 370/336; 455/66.1; 455/446

(58) Field of Classification Search
USPC ................. 370/203, 208, 338, 316, 336, 329; 455/66.1, 446
See application file for complete search history.

(56) References Cited

U.S. PATENT DOCUMENTS 5,706,048 A    1/1998 Davis
5,914,933 A *  6/1999 Cimini et al. ............... 370/208
(Continued)

FOREIGN PATENT DOCUMENTS

CN    1523846 A    8/2004
WO    2006/053215 A2    5/2006

OTHER PUBLICATIONS

Smulders P. "Exploiting the 60 GHz Band for Local Wireless Multimedia Access: Prospects and Future Directions", Communications Magazine, Jan. 2002, pp. 140-147, vol. 40, Issue 1, IEEE.

(Continued)

*Primary Examiner* — Helal A Algahaim
*Assistant Examiner* — Mahmoud Ismail
(74) *Attorney, Agent, or Firm* — Sughrue Mion, PLLC

(57) ABSTRACT

Provided are a wireless network system and a method of configuring the same, more particularly, a wireless network system and a method of configuring the same, in which a wireless network station desiring to transmit or receive data in a high-frequency band notifies a wireless network coordinator of its carrier transmission method to enable the wireless network coordinator to efficiently manage a network. An apparatus for transmitting or receiving data includes: a request command generation unit which generates a request command to secure network resources required to transmit or receive data before actually transmitting or receiving the data over a network; and a communication unit which transmits the request command.

30 Claims, 8 Drawing Sheets

(51) Int. Cl.
*H04W 28/26* (2009.01)
*H04L 27/00* (2006.01)
*H04B 7/185* (2006.01)
*H04J 3/00* (2006.01)
*H04B 7/00* (2006.01)
*H04W 40/00* (2009.01)
*H04W 72/04* (2009.01)
*H04L 27/20* (2006.01)

(56) References Cited

U.S. PATENT DOCUMENTS

| | | | |
|---|---|---|---|
| 6,404,751 | B1 | 6/2002 | Roark et al. |
| 6,414,944 | B1* | 7/2002 | Kolev et al. ............... 370/316 |
| 6,597,668 | B1 | 7/2003 | Schafer et al. |
| 7,203,156 | B1* | 4/2007 | Fukuda ..................... 370/203 |
| 2004/0160930 | A1 | 8/2004 | Choi et al. |
| 2005/0180385 | A1 | 8/2005 | Jeong et al. |
| 2005/0201346 | A1* | 9/2005 | Wang et al. ............... 370/338 |
| 2006/0160489 | A1* | 7/2006 | Hardacker ................ 455/66.1 |
| 2008/0002652 | A1* | 1/2008 | Gupta et al. .............. 370/338 |
| 2008/0004028 | A1* | 1/2008 | Vincent ..................... 455/446 |
| 2008/0101306 | A1* | 5/2008 | Bertrand et al. ........... 370/336 |

OTHER PUBLICATIONS

First Office Action issued Aug. 9, 2011 by the State Intellectual Property Office of P.R. China in counterpart Chinese Patent Application No. 200780039242.X.

Communication dated Jan. 11, 2013 issued by the State Intellectual Property Office of the People's Republic of China in counterpart Chinese Application No. 200780039242.X.

"Part 15.3: Wireless Medium Access Control (MAC) and Physical Layer (PHY) Specifications for High Rate Wireless Personal Area Networks (WPANs)" IEEE Std 802.15.3, Sep. 29, 2003, 324 pages.

"Part 15.3: Wireless Medium Access Control (MAC) and Physical Layer (PHY) Specifications for High Rate Wireless Personal Area Networks (WPANs): Amendment 1: Mac Sublayer" IEEE Std 802.15.3b-2005, May 5, 2006, 160 pages.

Communication dated May 28, 2012 issued by The State Intellectual Property Office of P.R. China in corresponding Chinese Application No. 200780039242.X.

Communication dated Jul. 17, 2013 issued by the European Patent Office in counterpart European Application No. 07851504.6.

Communication dated Jul. 26, 2013 issued by the European Patent Office in counterpart European Application No. 07851504.6.

Chen et al. "Wireless Gigabit Ethernet Extension," 2005 $2^{nd}$ International Conference on Broadband Networks, Oct. 3, 2005, pp. 458-466.

* cited by examiner

WIRELESS NETWORK SYSTEM AND METHOD OF CONFIGURING THE SAME

CROSS-REFERENCE TO RELATED PATENT APPLICATIONS

This application is a National Stage of International Application No. PCT/KR2007/006533 filed Dec. 14, 2007, and claims priority from Korean Patent Application No. 10-2007-0127064, filed on Dec. 7, 2007, in the Korean Intellectual Property Office, and U.S. Provisional Application No. 60/870,720, filed on Dec. 19, 2006, in the U.S. Patent and Trademark Office, the disclosures of which are incorporated herein in their entireties by reference.

FIELD OF THE INVENTION

Systems and methods consistent with the present invention relate to wireless networking and configuring the same, and more particularly, to a wireless network system and a method of configuring the same, in which a wireless network station desiring to transmit or receive data in a high-frequency band notifies a wireless network coordinator of its carrier transmission method to enable the wireless network coordinator to efficiently manage a network.

BACKGROUND OF THE INVENTION

As networks become wireless and the demand for large multimedia data transmission increases, there is a need for studies on an effective transmission method in a wireless network environment. In particular, the need for various home devices to wirelessly transmit high-quality videos, such as digital video disk (DVD) images or high-definition television (HDTV) images, is growing.

Wireless network stations that form a network can use different carrier transmission methods. However, different carrier transmission methods may make it impossible for a wireless network coordinator to efficiently manage the network.

Therefore, it is required to come up with an invention in which each wireless network station on a wireless network notifies a wireless network coordinator of its carrier transmission method so that the wireless network coordinator can efficiently manage the network.

SUMMARY

Aspects of exemplary embodiments of the present invention provide a wireless network system and a method of configuring the same, in which a wireless network station desiring to transmit or receive data in a high-frequency band notifies a wireless network coordinator of its carrier transmission method to enable the wireless network coordinator to efficiently manage a network.

However, aspects of exemplary embodiments of the present invention are not restricted to the one set forth herein. The above and other aspects of exemplary embodiments of the present invention will become more apparent to one of ordinary skill in the art to which exemplary embodiments of the present invention pertain by referencing the detailed description of exemplary embodiments of the present invention given below.

According to an aspect of exemplary embodiments of the present invention, there is provided an apparatus for transmitting or receiving data using millimeter wave (mmWave). The apparatus includes: a request command generation unit which generates a request command to secure network resources required to transmit or receive data before actually transmitting or receiving the data over a network; and a communication unit which transmits the request command.

According to another aspect of exemplary embodiments of the present invention, there is provided an apparatus functioning as a wireless network coordinator and managing wireless network stations which transmit or receive data using mmWave. The apparatus includes: a communication capability management unit which receives a request command and identifies a carrier transmission method of a transmitting station, which transmitted the request command, with reference to the request command; a frame generation unit which generates a network management frame specifying the carrier transmission method; and a communication unit which transmits the generated network management frame.

According to another aspect of exemplary embodiments of the present invention, there is provided a method of transmitting or receiving data using mmWave. The method includes: generating a request command to secure network resources required to transmit or receive data before actually transmitting or receiving the data over a network; and transmitting the request command.

According to another aspect of exemplary embodiments of the present invention, there is provided a method of functioning as a wireless network coordinator and managing wireless network stations which transmit or receive data using mmWave. The method includes: receiving a request command and identifying a carrier transmission method of a transmitting station, which transmitted the request command, with reference to the request command; generating a network management frame which specifies the carrier transmission method; and transmitting the generated network management frame.

BRIEF DESCRIPTION OF THE DRAWINGS

The above and other aspects and features of exemplary embodiments of the present invention will become more apparent by describing in detail exemplary embodiments thereof with reference to the attached drawings, in which.

DETAILED DESCRIPTION OF EXEMPLARY EMBODIMENTS

Figure 1:
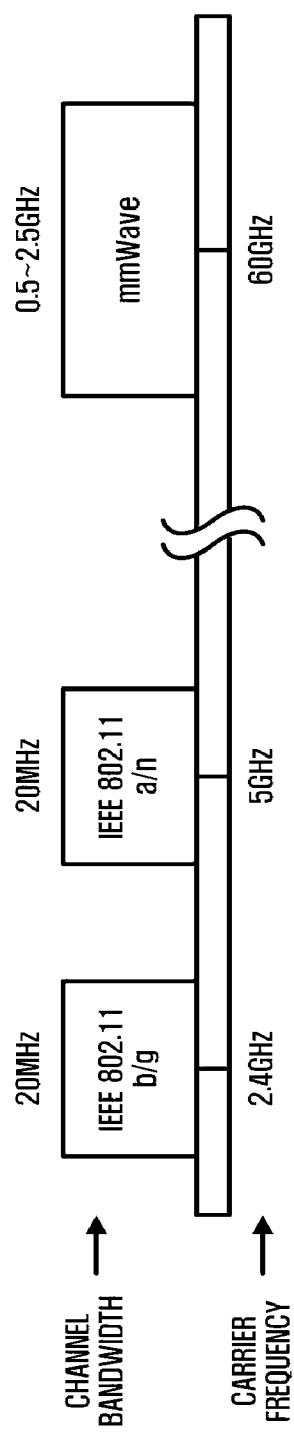
FIG. 1 is a diagram which compares frequency bands of Electrical and Electronics Engineers (IEEE) 802.11 series of standards and millimeter wave (mmWave)

Aspects and features of exemplary embodiments of the present invention and methods of accomplishing the same may be understood more readily by reference to the following detailed description of exemplary embodiments and the accompanying drawings. The exemplary embodiments of present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and exemplary embodiments of the present invention will only be defined by the appended claims. Like reference numerals refer to like elements throughout the specification.

The term 'unit', as used herein, means, but is not limited to, a software or hardware component, such as a Field Programmable Gate Array (FPGA) or Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

Exemplary embodiments of the present invention will hereinafter be described in detail with reference to the accompanying drawings.

A task group of the Institute of Electrical and Electronics Engineers (IEEE), 802.15.3c, is developing a technological standard for transmitting large-volume data over a wireless home network. The technological standard, which is called "millimeter wave (mmWave)," uses an electric wave having a physical wavelength of a millimeter (i.e., an electric wave having a frequency band of 30-300 GHz) to transmit large-volume data. This frequency band, which is an unlicensed bandwidth, has conventionally been used by communication service providers or used for limited purposes, such as observing electric waves or preventing vehicle collision.

FIG. 1 is a diagram which compares frequency bands of IEEE 802.11 series of standards and mmWave. Referring to FIG. 1, an IEEE 802.11b or IEEE 802.11g standard uses a carrier frequency of 2.4 GHz and has a channel bandwidth of approximately 20 MHz. In addition, an IEEE 802.11a or IEEE 802.11n standard uses a carrier frequency of 5 GHz and has a channel bandwidth of approximately 20 MHz. On the other hand, mmWave uses a carrier frequency of 60 GHz and has a channel bandwidth of approximately 0.5-2.5 GHz. Therefore, it can be understood that mmWave has a far greater carrier frequency and channel bandwidth than the conventional IEEE 802.11 series of standards. When a high-frequency signal (a millimeter wave) having a millimeter wavelength is used, a very high transmission rate of several Gbps can be achieved. Since the size of an antenna can also be reduced to less than 1.5 mm, a single chip which includes the antenna can be implemented. Furthermore, interference between devices can be reduced due to a very high attenuation ratio of the high-frequency signal in the air.

A method of transmitting uncompressed audio or video data (hereinafter, referred to as uncompressed AV data) between wireless devices using a high bandwidth of a millimeter wave has recently been studied. Compressed AV data is generated after lossy compression processes which includes motion compensation, discrete cosine transform (DCT), quantization, and variable length coding (VLC) processes. In so doing, portions of the compressed AV data to which human visual and auditory senses are less sensitive are removed. On the other hand, uncompressed AV data includes digital values indicating pixel components (for example, red (R), green (G) and blue (B) components). As described above, since wireless devices exchange original, uncompressed data with each other, a user can be provided with high image and sound quality contents.

Figures 2, 3:
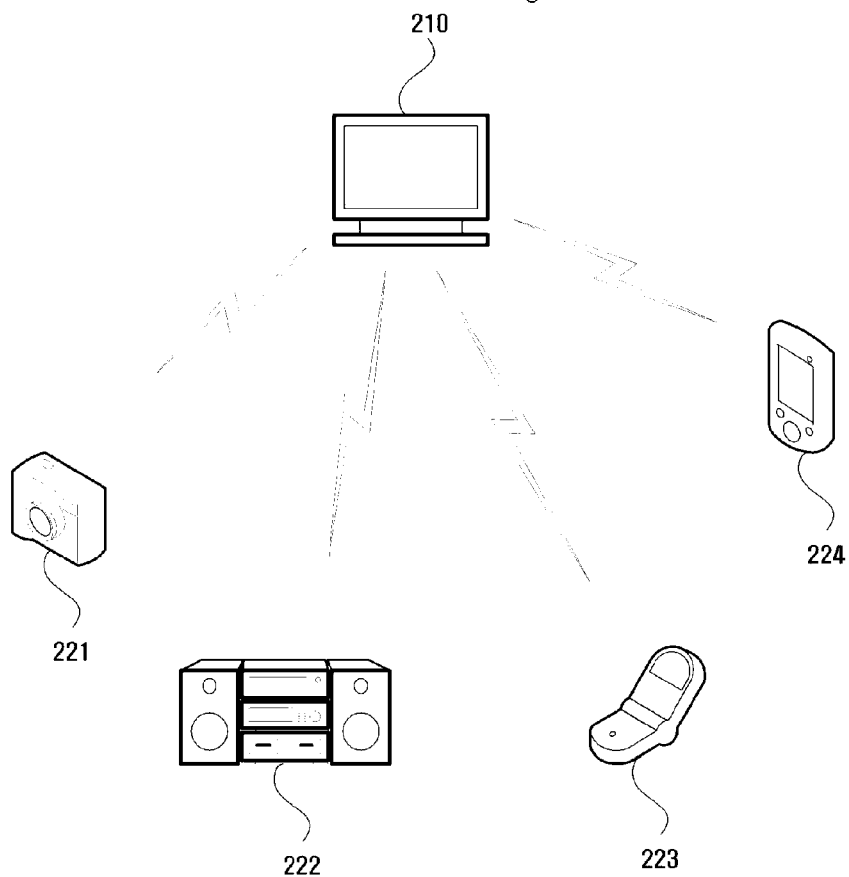
FIG. 2 is a conceptual diagram illustrating a wireless network system according to an exemplary embodiment of the present invention.
FIG. 3 is a conceptual diagram illustrating a communication hierarchy according to an exemplary embodiment of the present invention.

FIG. 2 is a conceptual diagram illustrating a wireless network system according to an exemplary embodiment of the present invention. Referring to FIG. 2, the wireless network system includes a wireless network coordinator 210 and a plurality of wireless network stations 221 through 224.

The wireless network coordinator 210 coordinates bandwidth allocation to the wireless network stations 221 through 224 existing on a network by transmitting a beacon to the wireless network stations 221 through 224. That is, with reference to the received beacon, each of the wireless network stations 221 through 224, which form the network, stands by to be allocated a bandwidth or, if allocated a bandwidth, transmits data to another wireless network station through the allocated bandwidth.

The network according to the present exemplary embodiment is defined by a superframe which includes one or more channel time blocks. The channel time blocks may be classified into reserved channel time blocks and unreserved channel time blocks. A reserved channel time block is a reserved time period during which a bandwidth is allocated to a specified wireless network station on a network. In addition, an unreserved channel time block is a time period during which a bandwidth is allocated to a wireless network station selected by contention from a plurality of wireless network stations on a network. A channel time block denotes a predetermined time period during which data is exchanged between wireless network stations existing on a network. The reserved channel time block and the unreserved channel time block correspond to a channel time allocation period (CTAP) and a contention access period (CAP), respectively.

Therefore, a wireless network station may transmit desired data through contention with other wireless network stations in an unreserved channel time block or transmit the data in a reserved channel time block allocated thereto.

mmWave technology which uses a carrier frequency of 60 GHz and enables data transmission at a channel bandwidth of 0.5 to 2.5 GHz may require directional communication. That is, antennas of a transmitting station and a receiving station may be made to face each other for data communication. Accordingly, beamforming may be performed to synchronize the directions of electric waves.

Beamforming, as used herein, may be understood as controlling the directions of electric waves output from the antennas of the transmitting and receiving stations to match each other, so that the transmitting station and the receiving station can smoothly exchange data with each other in a high-frequency band.

In order to wirelessly transmit data, a carrier transmission method in which signals are transmitted over carrier waves is used. The carrier transmission method includes a single carrier transmission method and a multi-carrier transmission method. The single carrier transmission method is a technique that modulates an analog or digital baseband signal over a single carrier wave and transmits the carrier wave carrying the modulated signal in a radio frequency (RF) band.

As communication technology evolves from analog communication to digital communication, the single carrier transmission method developed from the analog communication technology, such as amplitude shift keying (ASK), quadrature amplitude modulation (QAM) and frequency shift keying (FSK), has become unable to secure a sufficient amount of data transmitted and stability. In particular, in a wireless channel environment with limited transmission power, spectrum efficiency has become a very important technical element.

In this regard, the wireless network stations 221 through 224 according to the present exemplary embodiment use the multi-carrier transmission method to transmit data. Examples of the multi-carrier transmission method include an orthogonal frequency division multiplexing (OFDM) method and a discrete multi-tone (DMT) method. The OFDM method is a technique that modulates data in parallel over a plurality of carrier waves, which are successively arranged, and transmits the carrier waves carrying the modulated data to increase the amount of data transmitted. Here, if intervals at which the carrier waves are transmitted in parallel are synchronized with data transmission rates of symbols, interference between the carrier waves can be minimized or removed. Therefore, a signal can be easily and independently separated from each carrier wave.

The multi-carrier transmission method such as the OFDM method or the DMT method requires higher hardware performance than the single carrier transmission method due to a high peak-to-average power ratio of a signal. In this case, the hardware performance may include an analog-digital converting capability, a digital-analog converting capability, the operating range of an RF analog device, linearity, and frequency offset.

Hence, the single carrier transmission method or the multi-carrier transmission method may be appropriately used according to given conditions. Each of the wireless network stations 221 through 224 according to the present exemplary embodiment notifies the wireless network coordinator 210 of its carrier transmission method to help the wireless network coordinator 210 effectively manage the network.

FIG. 3 is a conceptual diagram illustrating a communication hierarchy 300 according to an exemplary embodiment of the present invention. Referring to FIG. 3, the communication hierarchy 300 is composed of a channel layer 340, a physical (PHY) layer 330, a media access control (MAC) layer 320, and an upper layer 310 sequentially stacked from bottom to top in this order. The channel layer 340 is a physical medium of a predetermined frequency band in which a radio signal is transmitted. The PHY layer 330 includes an RF layer 332 and a baseband layer 331. The upper layer 310 is higher than the MAC layer 320 and may include a logical link control (LLC) layer, a network layer, a transmission layer, and an application layer.

A wireless channel according to the present exemplary embodiment may include a low-frequency band of 2.4 GHz or 5 GHz as well as a high-frequency band of 60 GHz. Accordingly, the channel layer 340 can perform omni-directional communication as well as unidirectional communication. When omni-directional communication is performed, beamforming may be omitted.

Figure 4:
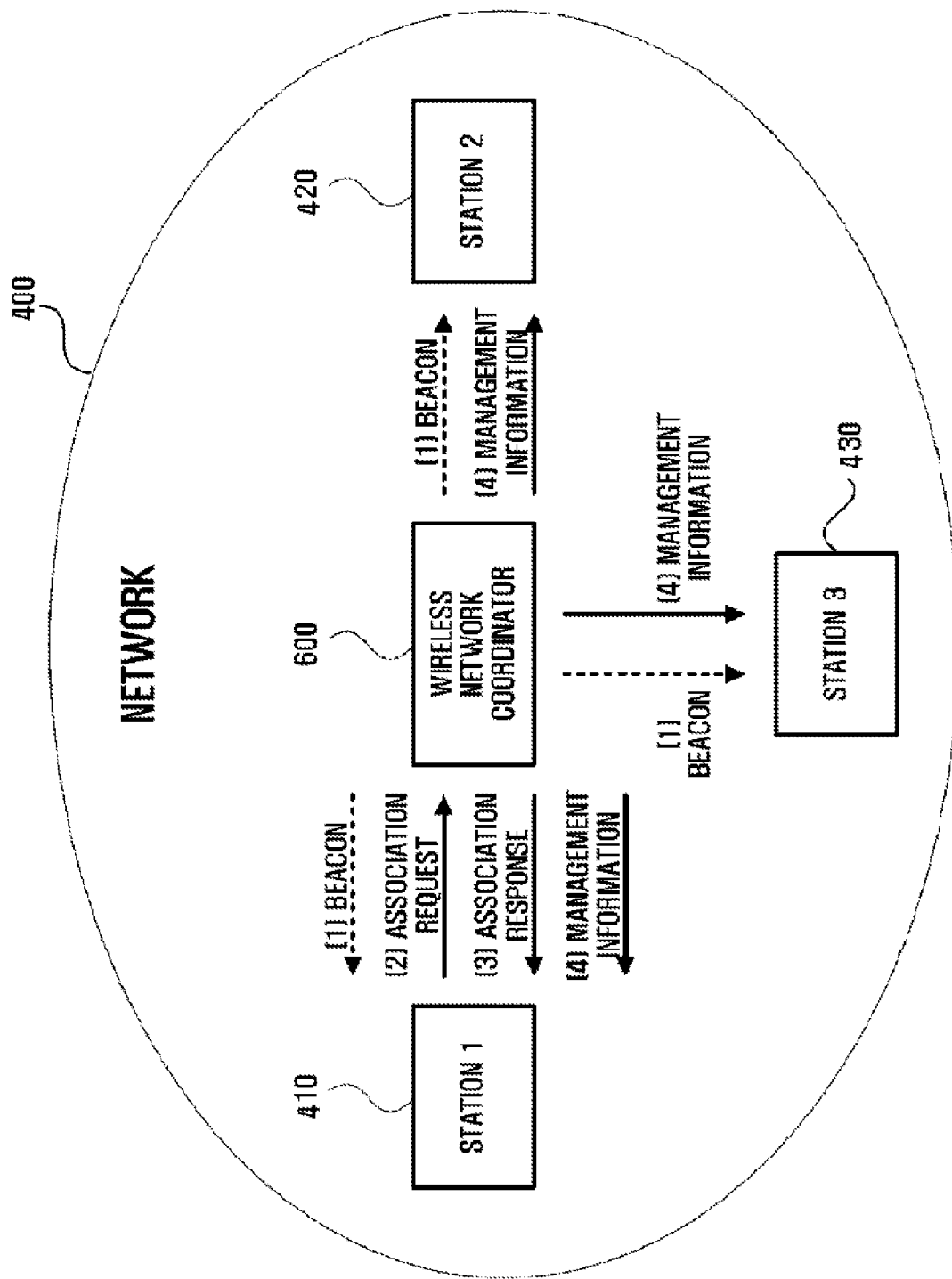
FIG. 4 is a conceptual diagram illustrating a process in which information about communication capability is exchanged according to an exemplary embodiment of the present invention.

FIG. 4 is a conceptual diagram illustrating a process in which information about communication capability is exchanged according to an exemplary embodiment of the present invention.

Referring to FIG. 4, a wireless network coordinator 600 broadcasts a beacon to first through third wireless network stations 410 through 430 on a network (400). The beacon contains an address of the wireless network coordinator 600 and information about a schedule for transmitting and receiving data over the network.

When intending to participate in the network, the first wireless network station 410 may transmit an association request command to the wireless network coordinator 600 based on the address of the wireless network coordinator 600 contained in the beacon. Here, the first wireless network station 410 may transmit the association request command 700 based on the schedule information contained in the received beacon. Since the wireless network coordinator 600 is currently unaware of the presence of the first wireless network station 410, it cannot include a reserved channel time block for the first wireless network station 410 in a superframe. Thus, the first wireless network station 410 may contend with the second and third wireless network stations 420 and 430 in an unreserved channel time block to transmit the association request command 700.

After receiving the association request command 700, the wireless network coordinator 600 transmits a participation response command to the first wireless network station 410. The participation response command may contain a message saying that the first wireless network station 410 is or is not permitted to participate in the network.

The association request command 700 contains the communication capability of the first wireless network station 410. Based on the communication capability of the first wireless network station 410, the wireless network coordinator 600 updates a communication capability list. The communication capability list specifies the communication capability of each wireless network station currently participating in the network. Whenever a new wireless network station participates in the network or whenever an existing wireless network station withdraws from the network, the communication capability list is updated.

Based on the communication capability list, the wireless network coordinator 600 determines whether to permit the allocation of a bandwidth to a wireless network station which wants to transmit data, generates a network management frame which specifies the communication capability of each wireless network station, and distributes the network management frame to the wireless network stations.

The communication capability may contain the data transmission/reception capability and carrier transmission method of each wireless network station. Among the wireless network stations which receive the network management frame, a wireless network station which wants to transmit data may transmit the data to a target wireless network station based on the communication capability of the target wireless network station.

The wireless network coordinator 600 may transmit the network management frame to a wireless network station in response to a request frame from the wireless network station. Alternatively, the wireless network coordinator 600 may transmit the network management frame to a wireless network station even without receiving any request frame from the wireless network station. In addition, the network management frame may be transmitted to a specified wireless network station or all wireless network stations on a network.

In order to secure network resources required to transmit or receive data, each of the first through third wireless network stations 410 through 430 transmits a request command, such as the association request command 700 or a bandwidth request command, to the wireless network coordinator 600. The first through third wireless network stations 410 through 430 existing on the network can have different communication capabilities. For example, while the first wireless network station 410 uses the single carrier transmission method, the second wireless network station 420 may use the multi-carrier transmission method. Thus, the request command according to exemplary embodiments of the present invention may take the form of a common signal that can be interpreted by all devices (i.e., all wireless network stations) on a network. That is, the request command in the form of the common signal can be transmitted using either the single carrier transmission method or the multi-carrier transmission method.

When receiving the association request command 700 or the bandwidth request command from a wireless network station, the wireless network coordinator 600 transmits the network management frame or a bandwidth response command or a beacon, which specifies a bandwidth allocation schedule, to the wireless network station. In order for a signal, i.e., the network management frame, the bandwidth response command, or the beacon, transmitted by the wireless network coordinator 600 to be interpreted by all wireless network stations on the network, the association request command 700, the bandwidth response command and the beacon may all take the form of a common signal.

That is, the network management frame, the bandwidth response command and the beacon in the form of a common signal can be transmitted using either the single carrier transmission method or the multi-carrier transmission method. Whatever transmission method is used, since a signal transmitted by the wireless network coordinator 600 takes the form of a common signal, it can be interpreted by all wireless network stations on the network.

The form of a common signal may be created by binary phase shift keying (BPSK).

Figure 5:
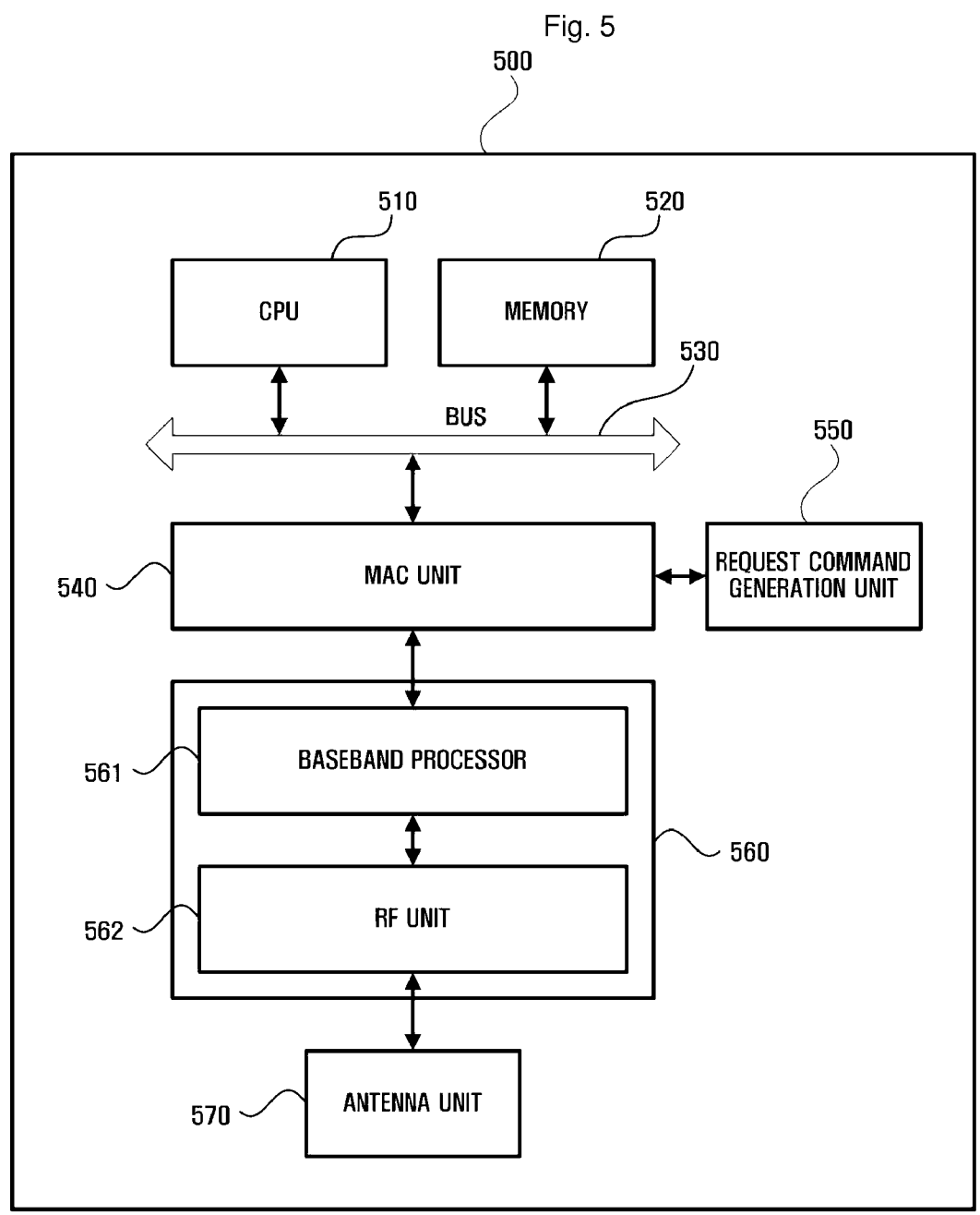
FIG. 5 is a block diagram of a wireless network station according to an exemplary embodiment of the present invention.

FIG. 5 is a block diagram of a wireless network station 500 according to an exemplary embodiment of the present invention. Referring to FIG. 5, the wireless network station 500 includes a central processing unit (CPU) 510, a memory 520, a MAC unit 540, a request command generation unit 550, a communication unit 560, and an antenna unit 570.

The CPU 510 controls other components connected to a bus 530 and is responsible for a job of the upper layer 310 illustrated in FIG. 3. In addition, the CPU 510 processes reception data (a reception MAC service data unit (MSDU)) provided by the MAC unit 540 or generates transmission data (a transmission MSDU) and transmits the generated transmission data to the MAC unit 540.

The memory 520 stores data. Here, the data includes uncompressed audio/video (AV) data. The memory 520 is a module to/from which information can input or output, such as a hard disk, a flash memory, a compact flash (CF) card, a secure digital (SD) card, a smart media (SM) card, a multimedia card (MMC), or a memory stick. The memory 520 may be implemented in the wireless network station 500 or in a separate apparatus. If the memory 520 is implemented in a separate apparatus, the communication unit 560 communicates with the separate apparatus to exchange data.

The MAC unit 540 adds a MAC header to an MSDU, i.e., data that is to be transmitted, provided by the CPU 510 and generates a MAC protocol data unit (MPDU).

The communication unit 560 converts the MPDU generated by the MAC unit 540 into a radio signal and transmits the radio signal through a predetermined communication channel. To this end, the communication unit 560 includes a baseband processor 561 and an RF unit 562 and is connected to the antenna unit 570. The antenna unit 570 may include one or more antennas and may be a single antenna, a switch antenna or a phased array antenna.

The baseband processor 561 receives the MPDU generated by the MAC unit 540, adds a signal field and a preamble to the MPDU, and generates a physical layer protocol data unit (PPDU). Then, the RF unit 562 converts the generated PPDU into a radio signal and transmits the radio signal through the antenna unit 570.

The request command generation unit 550 of the wireless network station 500 which wants to transmit or receive data generates a request command to secure network resources required to transmit or receive data before actually transmitting or receiving the data over a network. Hereinafter, a wireless network station which transmits data is referred to as a transmitting station, and a wireless network station which receives the data is referred to as a receiving station.

The request command includes the association request command 700 for requesting permission to participate in a network and/or a bandwidth request command for requesting bandwidth allocation in a time domain to transmit data. The association request command 700 contains information regarding the communication capability, e.g., the antenna capability, data transmission rate and carrier transmission method, of the wireless network station 500. The association request command 700 will be described in detail later with reference to FIG. 7.

The communication unit 560 transmits the association request command 700 or the bandwidth request command generated by the request command generation unit 550 to the wireless network coordinator 600 via the antenna unit 570. In addition, the communication unit 560 transmits or receives data. Here, the communication unit 560 may transmit or receive data using a carrier frequency of 60 GHz.

When receiving the association request command 700, the wireless network coordinator 600 transmits a participation response command. If the wireless network coordinator 600 permits the wireless network station 500 to participate in the network, it distributes the network management frame to all wireless network stations on the network.

The request command generation unit 550 of the wireless network station 500 which wants to transmit data may generate a bandwidth request command and transmit the bandwidth request command to the wireless network coordinator 600. Here, the wireless network coordinator 600 determines whether to allocate a bandwidth to the wireless network station 500 in consideration of the communication capability of a receiving station and transmits a bandwidth response command to a transmitting station, i.e., the wireless network station 500. If the wireless network station 500, i.e., the transmitting station, is allocated a bandwidth in a channel section by the wireless network coordinator 600, it transmits data to the receiving station in the channel section.

Figure 6:
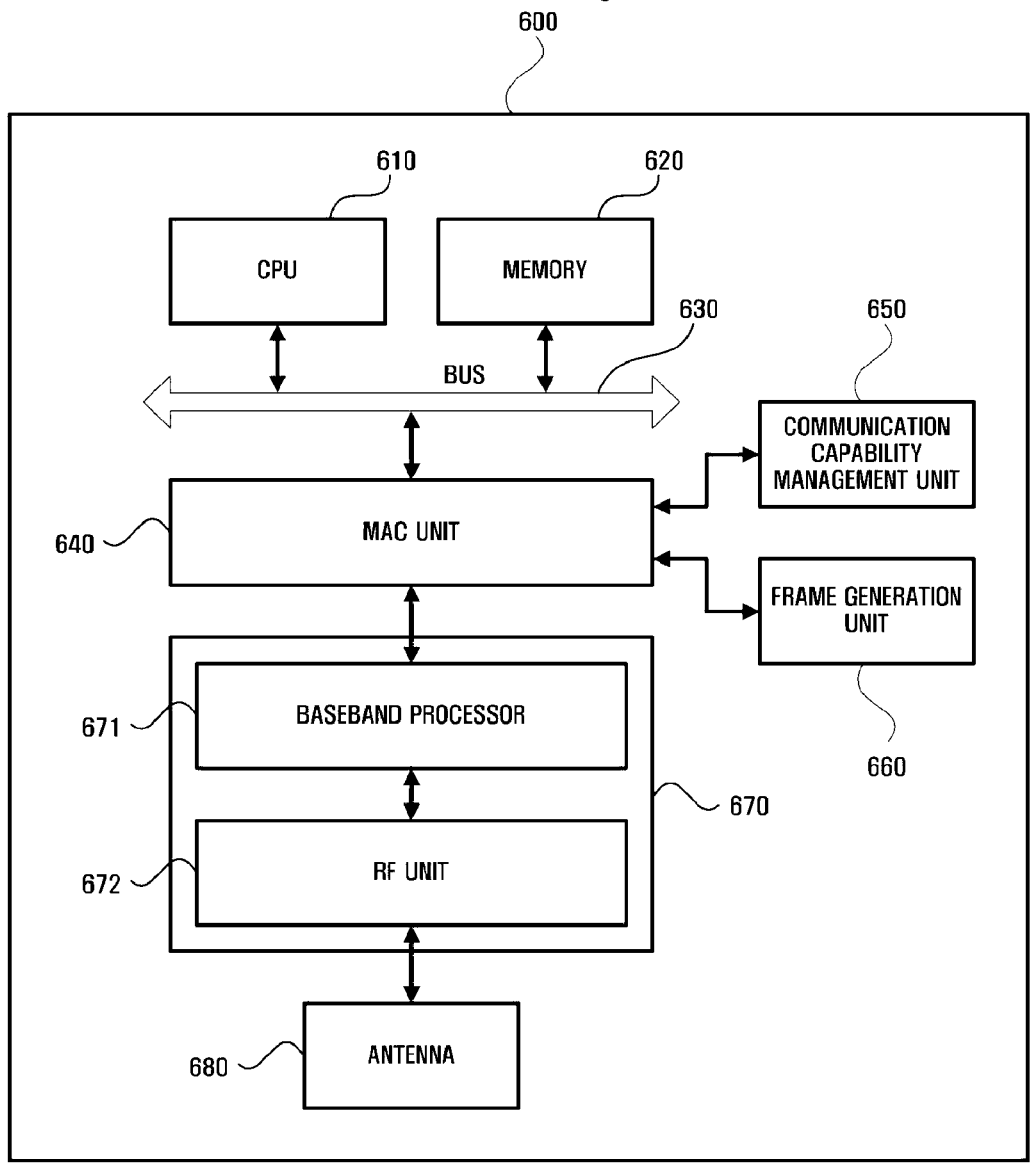
FIG. 6 is a block diagram of a wireless network coordinator according to an exemplary embodiment of the present invention.

FIG. 6 is a block diagram of a wireless network coordinator 600 according to an exemplary embodiment of the present invention.

Referring to FIG. 6, the wireless network coordinator 600 includes a CPU 610, a memory 620, a MAC unit 640, a communication capability management unit 650, a frame generation unit 660, a communication unit 670, and an antenna unit 680.

The CPU 610, the memory 620, a bus 630, the MAC unit 640, the communication unit 670 and the antenna unit 680 included in the wireless network coordinator 600 are similar to those of the wireless network station 500, and thus a detailed description thereof will be omitted.

In order to participate in the network the wireless network station 500 transmits an association request command to the wireless network coordinator 600. Then, the received association request command is transmitted to the communication capability management unit 650.

By referring to the received association request command, the communication capability management unit 650 identifies the communication capability of the wireless network station 500 which transmitted the association request command. Then, the communication capability management unit 650 updates a communication capability list pre-stored in the memory 620 by adding the communication capability of the wireless network station 500 to the communication capability list. The communication capability of the wireless network station 500 identified by the communication capability management unit 650 includes a carrier transmission method supported by the wireless network station 500.

The frame generation unit 660 generates a network management frame specifying the communication capability of the wireless network station 500 which wants to participate in the network. Here, the frame generation unit 660 may generate a network management frame which specifies the communication capabilities of all wireless network stations currently participating in the network.

The communication unit 670 transmits the generated network management frame via the antenna unit 680. In this case, the network management frame is transmitted to all wireless network stations on the network. Accordingly, a wireless network station which wants to transmit data can transmit data to a target wireless network station according to the communication capability of the target station which is specified in the network management frame.

In order to be allocated a bandwidth to transmit data, a transmitting station transmits a bandwidth request command to the wireless network coordinator 600. Accordingly, the communication capability management unit 650 of the wireless network coordinator 600 determines whether to permit allocation of a bandwidth to the transmitting station with reference to the communication capability list.

That is, the communication capability management unit 650 compares the communication capabilities of a transmitting station and a receiving station to determine whether to permit bandwidth allocation. If the communication capability of the transmitting station is identical or similar to that of the receiving station, the communication capability management unit 650 permits bandwidth allocation. If not, the communication capability management unit 650 does not permit bandwidth allocation.

For example, if the carrier transmission method of the transmitting station is the multi-carrier transmission method while that of the receiving station is the single carrier transmission method, the transmitting station and the receiving station cannot smoothly exchange data with each other. Thus, the communication capability management unit 650 does not permit bandwidth allocation.

The determination result of the communication capability management unit 650 is transmitted to the frame generation unit 660, and the frame generation unit 660 generates a bandwidth response command corresponding to the received determination result. The bandwidth response command may include information on whether bandwidth allocation is permitted.

When bandwidth allocation is permitted, the frame generation unit 660 may generate a beacon which specifies a bandwidth allocation schedule.

Signals generated by the frame generation unit 660 for network management includes frames in the form of a common signal that can be interpreted by all devices on the network. At least one frame in the form of the common signal may include at least one of a network management frame, a bandwidth response command and a beacon.

Figure 7:
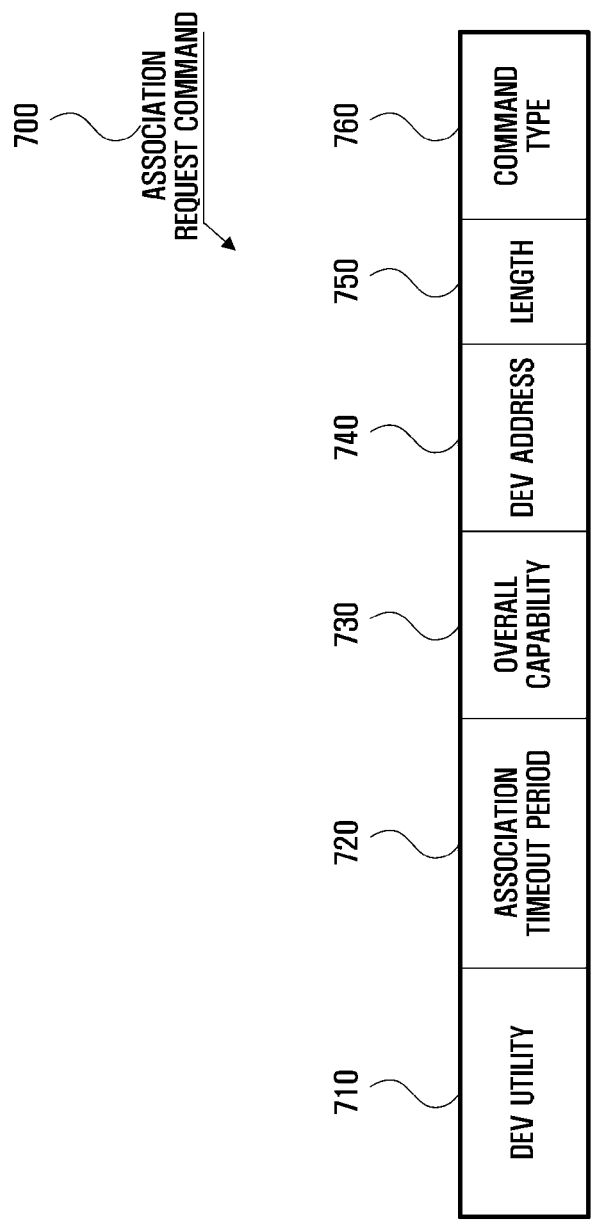
FIG. 7 illustrates an association request command according to an exemplary embodiment of the present invention.

FIG. 7 illustrates an association request command 700 according to an exemplary embodiment of the present invention. Referring to FIG. 7, the association request command 700 includes a device (DEV) utility field 710, an association timeout period field 720, an overall capability field 730, a DEV address field 740, a length field 750, and a command type field 760.

The DEV utility field 710 specifies whether a wireless network station, which can function as a wireless network coordinator, will form a piconet on the same channel as and adjacent to a currently existing piconet and function as a wireless network coordinator. In addition, the DEV utility field 710 specifies whether a wireless network station attempting to participate in a network has requested a wireless network coordinator to transmit a piconet service command. Here, the piconet service command may include at least one of piconet service information elements. A piconet service information element is used to provide information about the capability of each wireless network station in an application hierarchy.

In the association timeout period field 720, a maximum time during which a wireless network coordinator can be connected to a wireless network stations without communicating each other is expressed in milliseconds.

The DEV address field 740 provides the address of a wireless network station which requests the permission of its participation in the network.

The length field 750 provides the length of the association request command 700, and the command type field 760 provides a value indicating the association request command 700.

Figure 8:
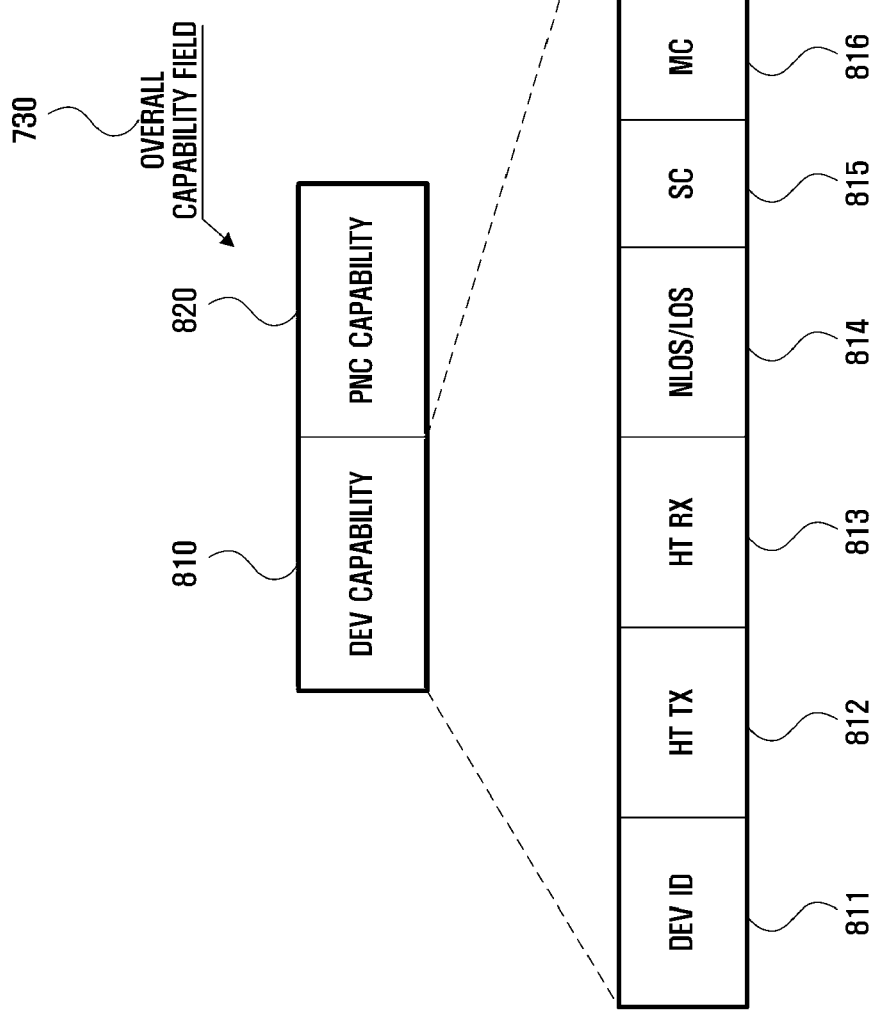
FIG. 8 illustrates a detailed configuration of an overall capability field included in the association request command of FIG. 7.

The overall capability field 730 specifies the communication capabilities of a wireless network station as a wireless network station and as a wireless network coordinator. FIG. 8 illustrates a detailed configuration of the overall capability field 730 included in the association request command 700. Referring to FIG. 8, the overall capability field 730 includes a DEV capability field 810 and a piconet coordinator (PNC) capability field 820.

The DEV capability field 810 includes a device identifier (DEV ID) field 811, a high throughput transmitter (HT TX) field 812, a high throughput receiver (HT RX) field 813, a non-line of sight/line of sight (NLOS/LOS) field 814, a single carrier (SC) field 815, a multi-carrier (MC) field 816, and a stream timeout period (STP) 817.

The DEV ID field 811 specifies the type of a device according to its capability in an application layer. Here, the type of a device may include at least one of a digital television (TV), a settop box, a personal video recorder, a digital video disc (DVD) player, a BLUE-RAY DISC (BD) player, a HIGH-DEFINITION (HD) DVD player, a DVD recorder, a BD recorder, an HD DVD recorder, an AV receiver, a personal computer, a video projector, a game console, a digital video camera, a digital still camera, a personal digital assistant (PDA), a personal multimedia player (PMP), an MP3 player and a cellular phone.

The HT TX field 812 specifies whether the capability of a physical layer, which can change the direction of a beam and transmit data at a transmission rate of 1 Gb/s or higher, is provided.

The HT RX field 813 specifies whether the capability of a physical layer, which can change the direction of a beam and receive data at a transmission rate of 1 Gb/s or higher, is provided.

The NLOS/LOS field 814 specifies whether impediments to radio wave transmission exist nearby. For example, the NLOS/LOS field 814 may specify whether an obstacle exists within a predetermined distance. To this end, a device which can identify the presence of an obstacle may be implemented in a corresponding wireless network station. For example, the device of the wireless network station may identify the presence of an obstacle within several meters from the station.

The SC field 815 specifies whether a wireless network station supports the single carrier transmission method. The MC field 816 specifies whether a wireless network station supports the multi-carrier transmission method. Here, the multi-carrier transmission method may be the OFDM method.

The STP field 817 specifies whether a stream can be updated in a stream timeout period.

In the PNC capability field 820 of the overall capability field 730, the communication capability of a wireless network station when functioning as a wireless network coordinator is provided. For example, the maximum number of wireless network stations that can participate in a network, the maximum number of channel time request blocks that can be managed, maximum transmission power, and the grade of a wireless network coordinator are provided in the PNC capability field 820. The grade of the wireless network coordinator may be used as a basis for selecting a wireless network coordinator.

Figure 9:
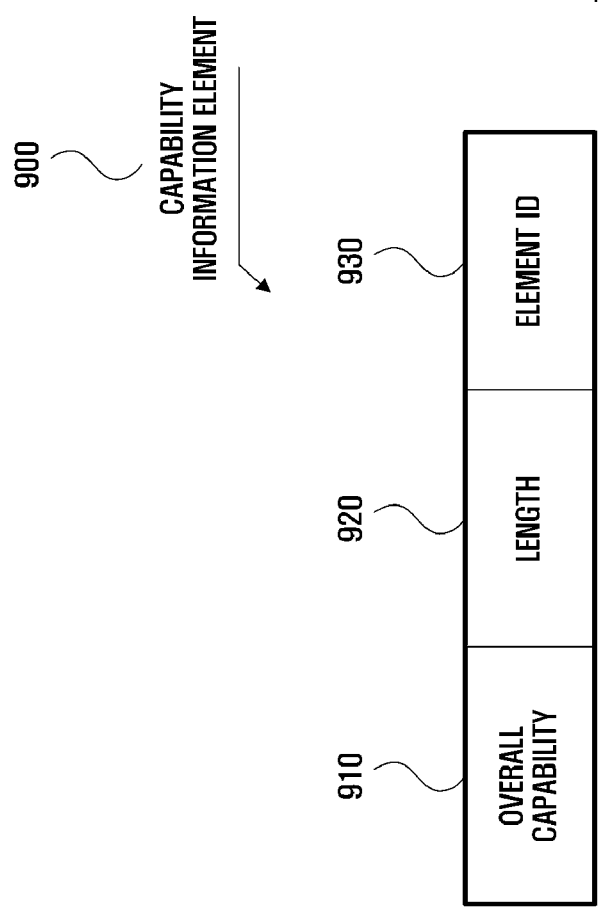
FIG. 9 illustrates a capability information element field according to an exemplary embodiment of the present invention.

FIG. 9 illustrates a capability information element field 900 according to an exemplary embodiment of the present invention. Referring to FIG. 9, the capability information element field 900 includes an overall capability field 910, a length field 920, and an element ID field 930.

The length field 920 provides the length of the capability information element field 900, and the element ID field 930 provides an identifier indicating the capability information element field 900.

The overall capability field 910 is identical to the overall capability field 730 described above with reference to FIG. 8.

As described above, the wireless network coordinator 600 receives the association request command 700 from a wireless network station which wants to participate in the network and updates the communication capability list. Based on the updated communication capability list, the wireless network coordinator 600 generates a network management frame and distributes the network management frame to all wireless network stations on the network. Here, the network management frame may include the capability information element field 900 of each wireless network station.

Accordingly, each wireless network station on the network can transmit or receive data to a target station by referring to the capability of the target wireless network station.

While exemplary embodiments of the present invention has been particularly shown and described with reference to exemplary embodiments thereof, it will be understood by those of ordinary skill in the art that various changes in form and detail may be made therein without departing from the spirit and scope of exemplary embodiments of the present invention as defined by the following claims. The exemplary embodiments should be considered in a descriptive sense only and not for purposes of limitation.

As described above, in a wireless network system and a method of configuring the same according to exemplary embodiments of the present invention, a wireless network station which wants to transmit or receive data in a high-frequency band notifies a wireless network coordinator of its carrier transmission method. Therefore, the wireless network coordinator can efficiently manage a network.

The invention claimed is:

1. An apparatus for transmitting or receiving data using a millimeter wave, the apparatus comprising:
   a request command generation unit which generates a request command to secure network resources used to transmit or to receive data, before transmitting or receiving the data over a network, wherein the request command comprises an association request command for requesting permission to participate in the network, and the association request command comprises a single carrier field which specifies whether a single carrier transmission method is supported by the apparatus and a multi-carrier field which specifies whether a multi-carrier transmission method is supported by the apparatus; and
   a communication unit which transmits the request command.

2. The apparatus of claim 1, wherein the request command comprises a bandwidth request command for requesting allocation of a time period to transmit the data.

3. The apparatus of claim 1, wherein the association request command further comprises:
   a device ID field which indicates a type of a device according to a capability of the device in an application layer;
   a high throughput transmitter field which specifies whether a capability of a physical layer, which can change a direction of a beam and transmit the data at a transmission rate of 1 Gb/s or higher, is provided;
   a high throughput receiver field which specifies whether the capability of the physical layer is provided;
   a non-line of sight/line of sight field which specifies whether impediments to radio wave transmission exist within a predetermined distance; and
   a stream timeout period field which specifies whether a stream can be updated in a stream timeout period.

4. The apparatus of claim 3, wherein the type of the device comprises at least one of a digital television (TV), a settop box, a personal video recorder, a digital video disc (DVD) player, a BLU-RAY DISC (BD) player, a HIGH-DEFINITION (HD) DVD player, a DVD recorder, a BD recorder, an HD DVD recorder, an audio/video (AV) receiver, a personal computer, a video projector, a game console, a digital video camera, a digital still camera, a personal digital assistant (PDA), a personal multimedia player (PMP), an MP3 player, and a cellular phone.

5. The apparatus of claim 1, wherein the multi-carrier transmission method comprises an orthogonal frequency division multiplexing (OFDM) method.

6. The apparatus of claim 1, wherein the request command is contained in a common signal that can be interpreted by all devices on the network.

7. The apparatus of claim 6, wherein the request command contained in the common signal is transmitted using the single carrier transmission method or the multi-carrier transmission method.

8. The apparatus of claim 1, wherein the communication unit transmits or receives the data using a carrier frequency of 60 GHz.

9. An apparatus functioning as a wireless network coordinator and managing wireless network stations which transmit or receive data using millimeter wave, the apparatus comprising:
- a memory which stores a communication capability list which identifies a carrier transmission method of each of the wireless network stations currently participating in a network;
- a communication capability management unit which receives a request command and identifies a carrier transmission method of a transmitting station, which transmitted the request command, with reference to the request command, and updates the communication capability list with the carrier transmission method of the transmitting station;
- a frame generation unit which generates a network management frame based on the updated communication capability list, wherein the a network management frame specifies the carrier transmission method of the transmitting station; and
- a communication unit which transmits the generated network management frame.

10. The apparatus of claim 9, wherein the network management frame is contained in a common signal that can be interpreted by all devices on the network.

11. The apparatus of claim 10, wherein the frame generation unit further generates at least one of:
- a bandwidth response command which is generated in response to a bandwidth request command received from a wireless network station, requesting an allocation of a time period to transmit data; and
- a beacon which specifies a time period during which the data can be transmitted or received if the allocation of the time period is permitted; and
- the at least one of the bandwidth response command and the beacon is contained in the common signal.

12. The apparatus of claim 11, wherein the network management frame, the bandwidth response command and the beacon in the common signal are transmitted using a single carrier transmission method or a multi-carrier transmission method.

13. The apparatus of claim 10, wherein the common signal is generated using a binary phase shift keying (BPSK) method.

14. The apparatus of claim 9, wherein the network management frame further comprises at least one of:
- a device ID field which indicates a type of the transmitting station according to a capability of the transmitting station in an application layer;
- a high throughput transmitter field which specifies whether a capability of a physical layer, which can change a direction of a beam and transmit the data at a transmission rate of 1 Gb/s or higher, is provided in the transmitting station;
- a high throughput receiver field which specifies whether the capability of the physical layer is provided in the transmitting station;
- a non-line of sight/line of sight field which specifies whether impediments to radio wave transmission exist within a predetermined distance from the transmitting station;
- a single carrier field which specifies whether the single carrier transmission method is supported by the transmitting station;
- a multi-carrier field which specifies whether a multi-carrier transmission method is supported by the transmitting station; and
- a stream timeout period field which specifies whether a stream can be updated in a stream timeout period by the transmitting station.

15. A method of transmitting or receiving data using millimeter wave, the method comprising:
- generating a request command to secure network resources used to transmit or to receive data, before transmitting or receiving the data over a network, wherein the request command comprises an association request command for requesting permission to participate in the network, and the association request command comprises a single carrier field which specifies whether a single carrier transmission method is supported by the apparatus and a multi-carrier field which specifies whether a multi-carrier transmission method is supported by the apparatus; and
- transmitting the request command.

16. The method of claim 15, wherein the request command comprises a bandwidth request command for requesting allocation of a time period to transmit the data.

17. The method of claim 16, wherein the association request command further comprises:
- a device ID field which indicates a type of a device according to a capability of the device in an application layer;
- a high throughput transmitter field which specifies whether a capability of a physical layer, which can change a direction of a beam and transmit the data at a transmission rate of 1 Gb/s or higher, is provided;
- a high throughput receiver field which specifies whether the capability of the physical layer is provided;
- a non-line of sight/line of sight field which specifies whether impediments to radio wave transmission exist within a predetermined distance; and
- a stream timeout period field which specifies whether a stream can be updated in stream timeout period.

18. The method of claim 17, wherein the type of the device comprises at least one of a digital TV, a settop box, a personal video recorder, a digital video disc (DVD) player, a BLU-RAY DISC (BD) player, a HIGH-DEFINITION (HD) DVD player, a DVD recorder, a BD recorder, an HD DVD recorder, an AV receiver, a personal computer, a video projector, a game console, a digital video camera, a digital still camera, a personal digital assistant (PDA), a personal multimedia player (PMP), an MP3 player, and a cellular phone.

19. The method of claim 15, wherein the multi-carrier transmission method comprises an OFDM method.

20. The method of claim 15, wherein the request command is contained in a common signal that can be interpreted by all devices on the network.

21. The method of claim 15, wherein the request command contained in the common signal is transmitted using the single carrier transmission method or the multi-carrier transmission method.

22. The method of claim 15, wherein the data is transmitted or received using a carrier frequency of 60 GHz.

23. A method of functioning as a wireless network coordinator and managing wireless network stations which transmit or receive data using millimeter wave, the method comprising:
- storing a communication capability list which identifies a carrier transmission method of each of the wireless network stations currently participating in a network;
- receiving a request command and identifying a carrier transmission method of a transmitting station, which transmitted the request command, with reference to the request command;

updating the communication capability list with the carrier transmission method of the transmitting station;

generating a network management frame based on the updated communication capability list, wherein the a network management frame specifies the carrier transmission method of the transmitting station; and transmitting the generated network management frame.

24. The method of claim 23, wherein the network management frame is contained in a common signal that can be interpreted by all devices on the network.

25. The method of claim 24, wherein the generating further generates at least one of:

a bandwidth response command which is generated in response to a bandwidth request command received from a wireless network station requesting an allocation of a time period to transmit data; and a beacon which specifies a time period during which the data can be transmitted or received if the allocation of the time period is permitted; and the at least one of the bandwidth response command and the beacon is contained in the common signal.

26. The method of claim 25, wherein the network management frame, the bandwidth response command and the beacon in the common signal are transmitted using a single carrier transmission method or a multi-carrier transmission method.

27. The method of claim 24, wherein the common signal is generated using a BPSK method.

28. The method of claim 23, wherein the network management frame further comprises at least one of:

a device ID field which indicates a type of the transmitting station according to a capability of the transmitting station in an application layer;

a high throughput transmitter field which specifies whether a capability of a physical layer, which can change a direction of a beam and transmit the data at a transmission rate of 1 Gb/s or higher, is provided in the transmitting station;

a high throughput receiver field which specifies whether the capability of the physical layer, is provided in the transmitting station;

a non-line of sight/line of sight field which specifies whether impediments to radio wave transmission exist within a predetermined distance from the transmitting station;

a single carrier field which specifies whether the single carrier transmission method is supported by the transmitting station;

a multi-carrier field which specifies whether a multi-carrier transmission method is supported by the transmitting station; and a stream timeout period field which specifies whether a stream can be updated in a stream timeout period by the transmitting station.

29. The apparatus of claim 9, wherein the frame generation unit generates the network management frame based on the updated communication capability list, wherein the network management frame specifies the carrier transmission method of each of the wireless network stations currently participating in the network, including the carrier transmission method of a transmitting station.

30. The apparatus of claim 29, wherein the communication unit transmits the generated network management frame to all of the wireless network stations provided in the updated communication capability list, including the transmitting station.

* * * * *